Figure 1:
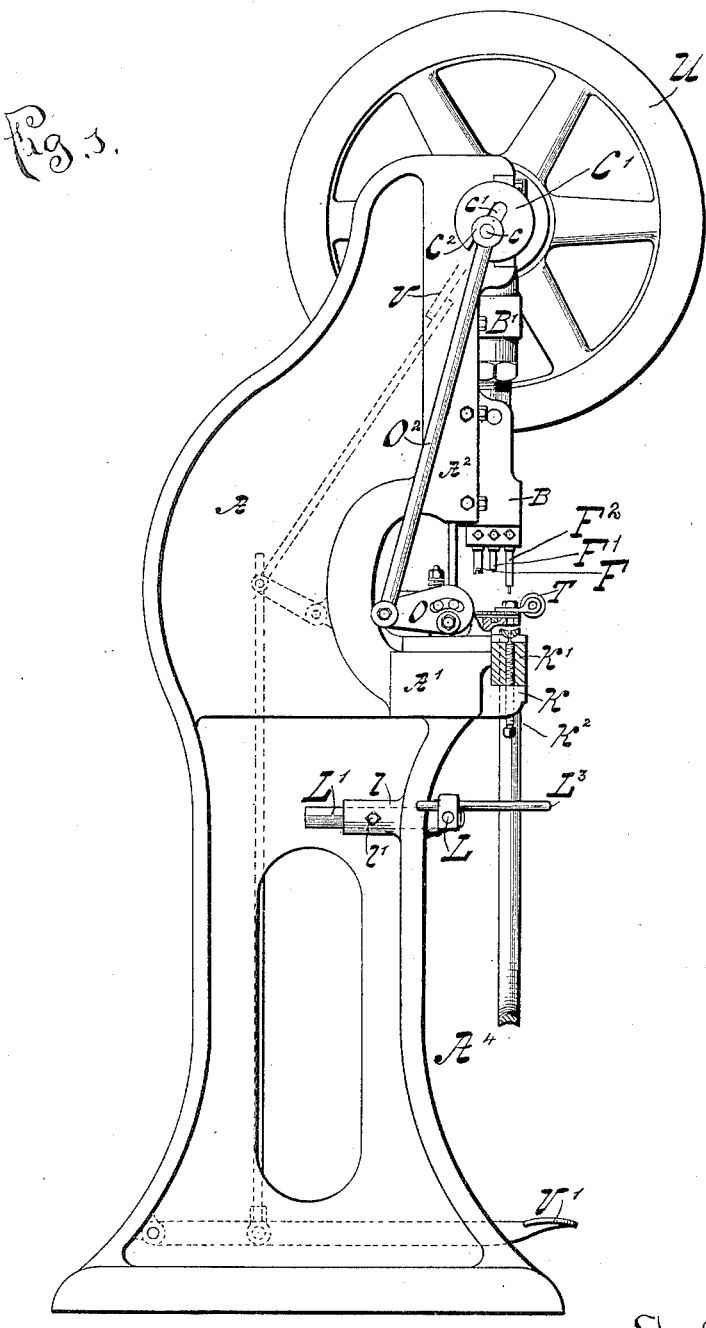

(No Model.)  7 Sheets—Sheet 1.

A. LEVEDAHL.
MACHINE FOR MAKING AND APPLYING SPOKE WASHERS.

No. 595,108.  Patented Dec. 7, 1897.

Witnesses:
J B Weir
Harold S Barrett

Inventor
Axel Levedahl
C. J. Poole & Brown Attys

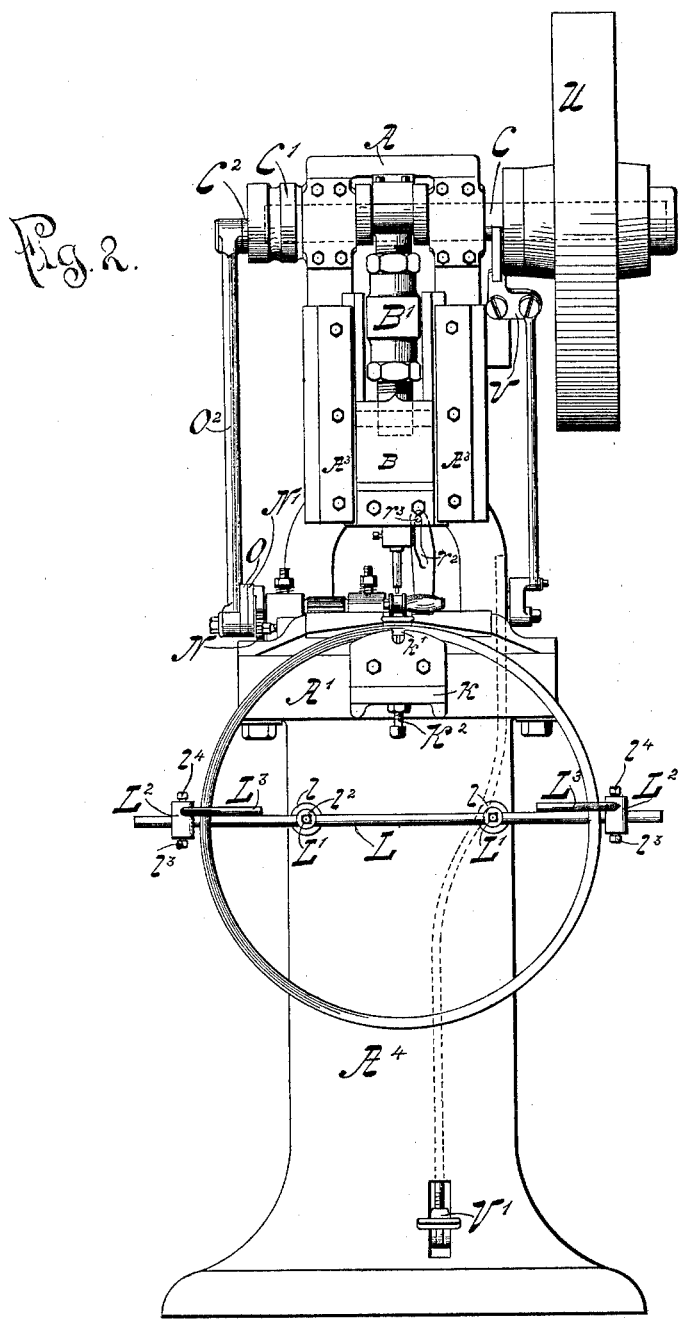

(No Model.) 7 Sheets—Sheet 3.
A. LEVEDAHL.
MACHINE FOR MAKING AND APPLYING SPOKE WASHERS.
No. 595,108. Patented Dec. 7, 1897.
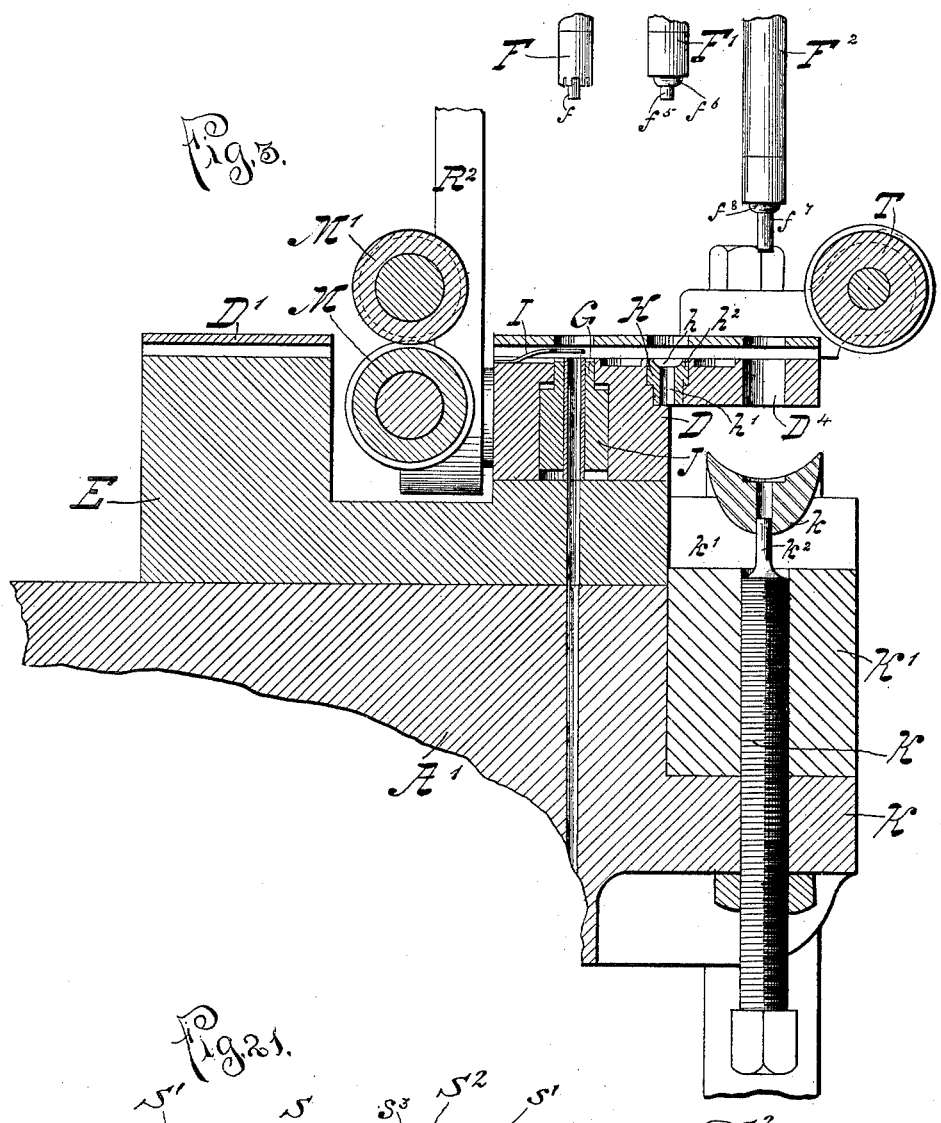
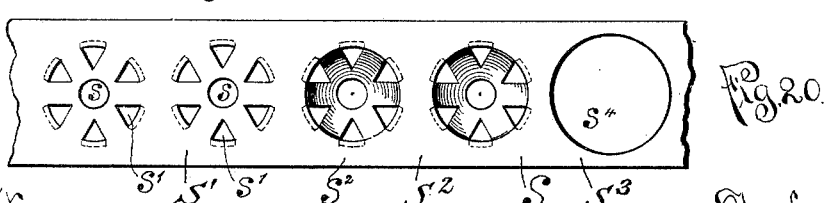
Witnesses:
J. B. Keir
Harold G. Barrett.
Inventor
Axel Levedahl.
by Poole & Brown Attys (No Model.) 7 Sheets—Sheet 4.
A. LEVEDAHL.
MACHINE FOR MAKING AND APPLYING SPOKE WASHERS.
No. 595,108. Patented Dec. 7, 1897.
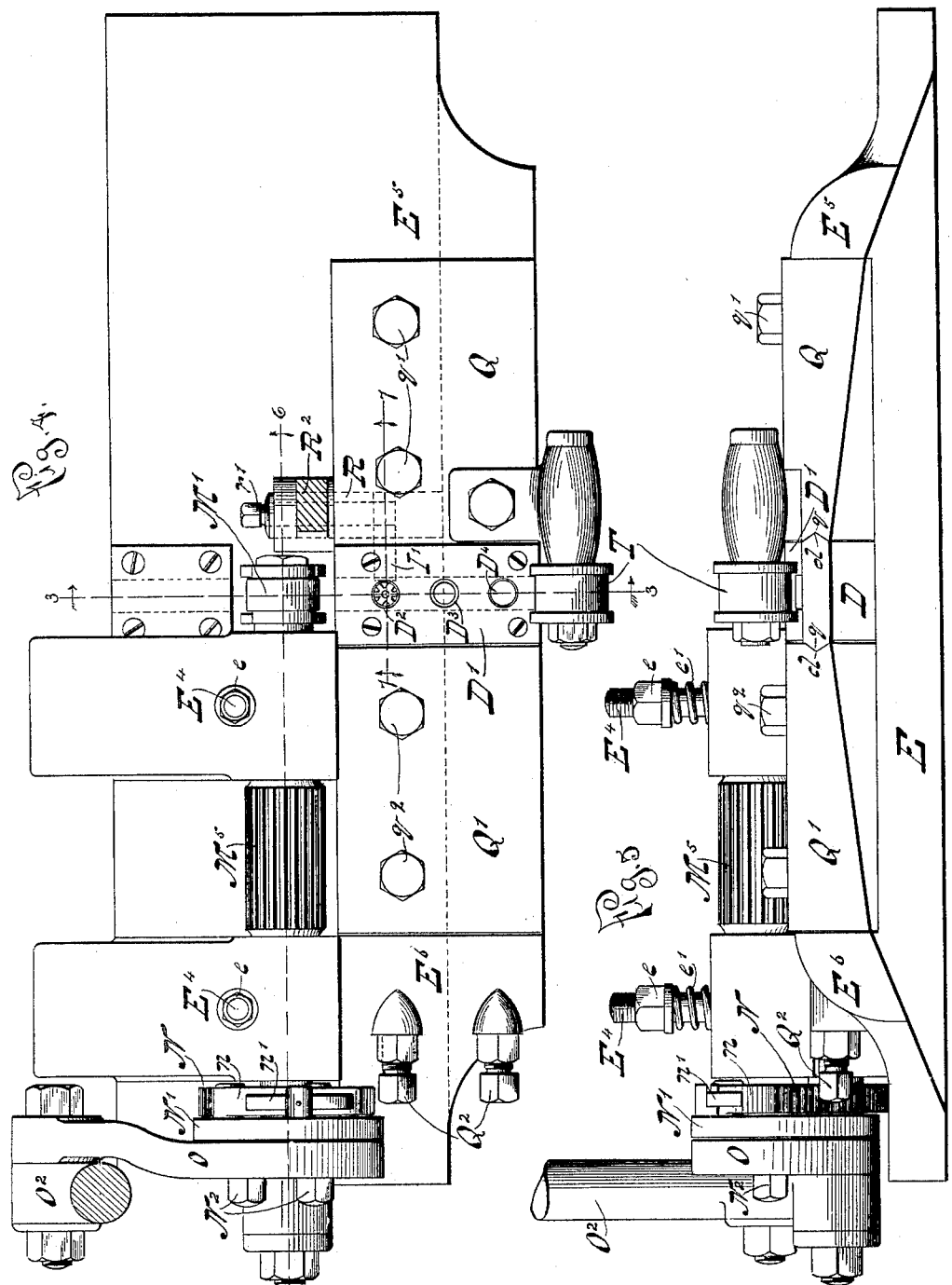
Witnesses.
Inventor.
Axel Levedahl.

(No Model.)
A. LEVEDAHL.
MACHINE FOR MAKING AND APPLYING SPOKE WASHERS.
No. 595,108. Patented Dec. 7, 1897.
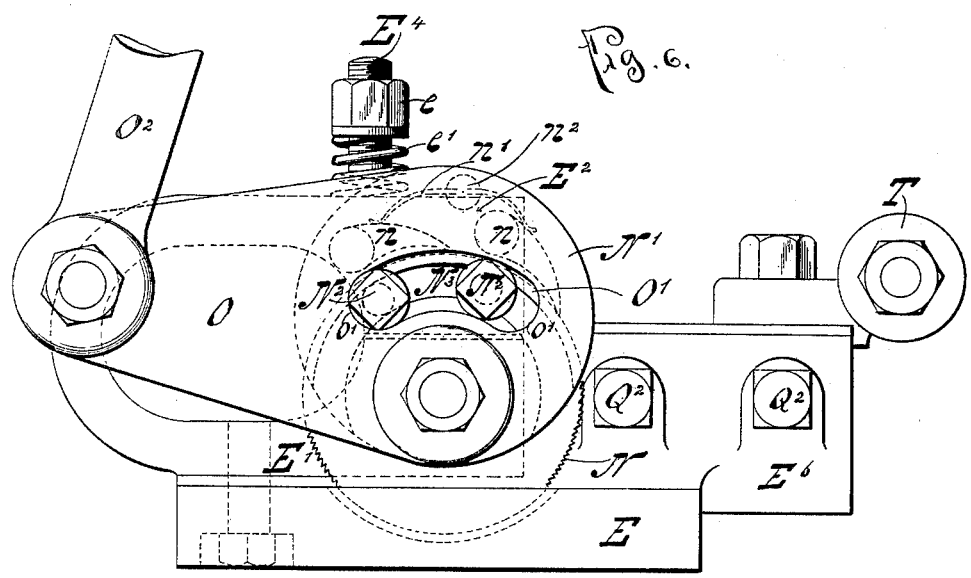
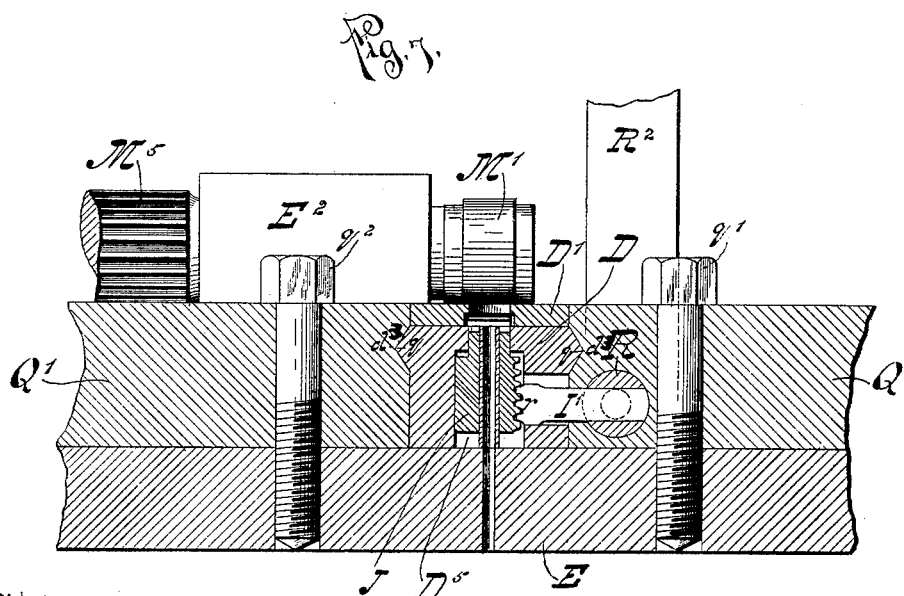
Witnesses:
Inventor
Axel Levedahl.

(No Model.) 7 Sheets—Sheet 6.
A. LEVEDAHL.
MACHINE FOR MAKING AND APPLYING SPOKE WASHERS.
No. 595,108. Patented Dec. 7, 1897.
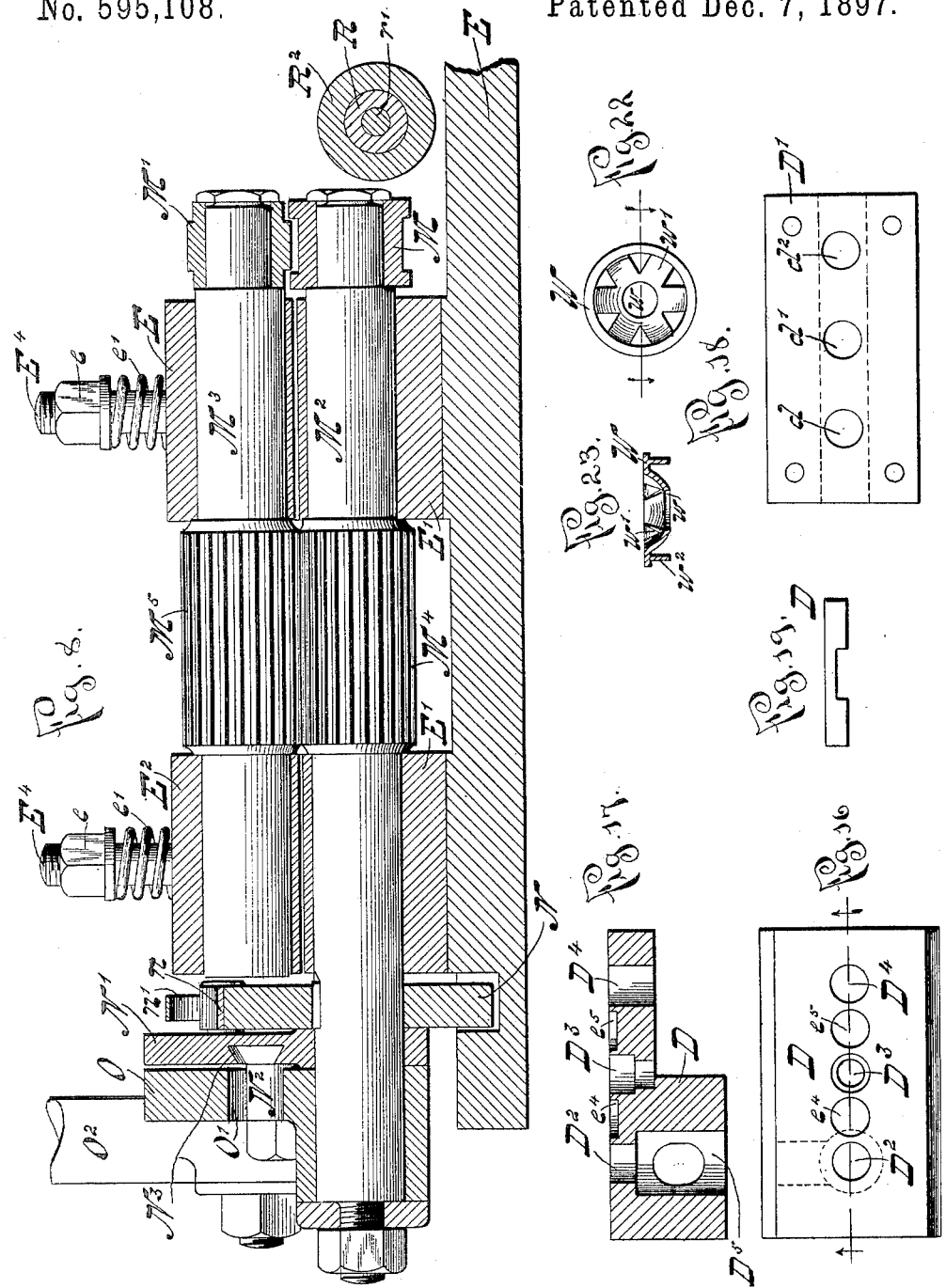
Witnesses:
Inventor.
Axel Levedahl.

(No Model.) 7 Sheets—Sheet 7.
A. LEVEDAHL.
MACHINE FOR MAKING AND APPLYING SPOKE WASHERS.
No. 595,108. Patented Dec. 7, 1897.
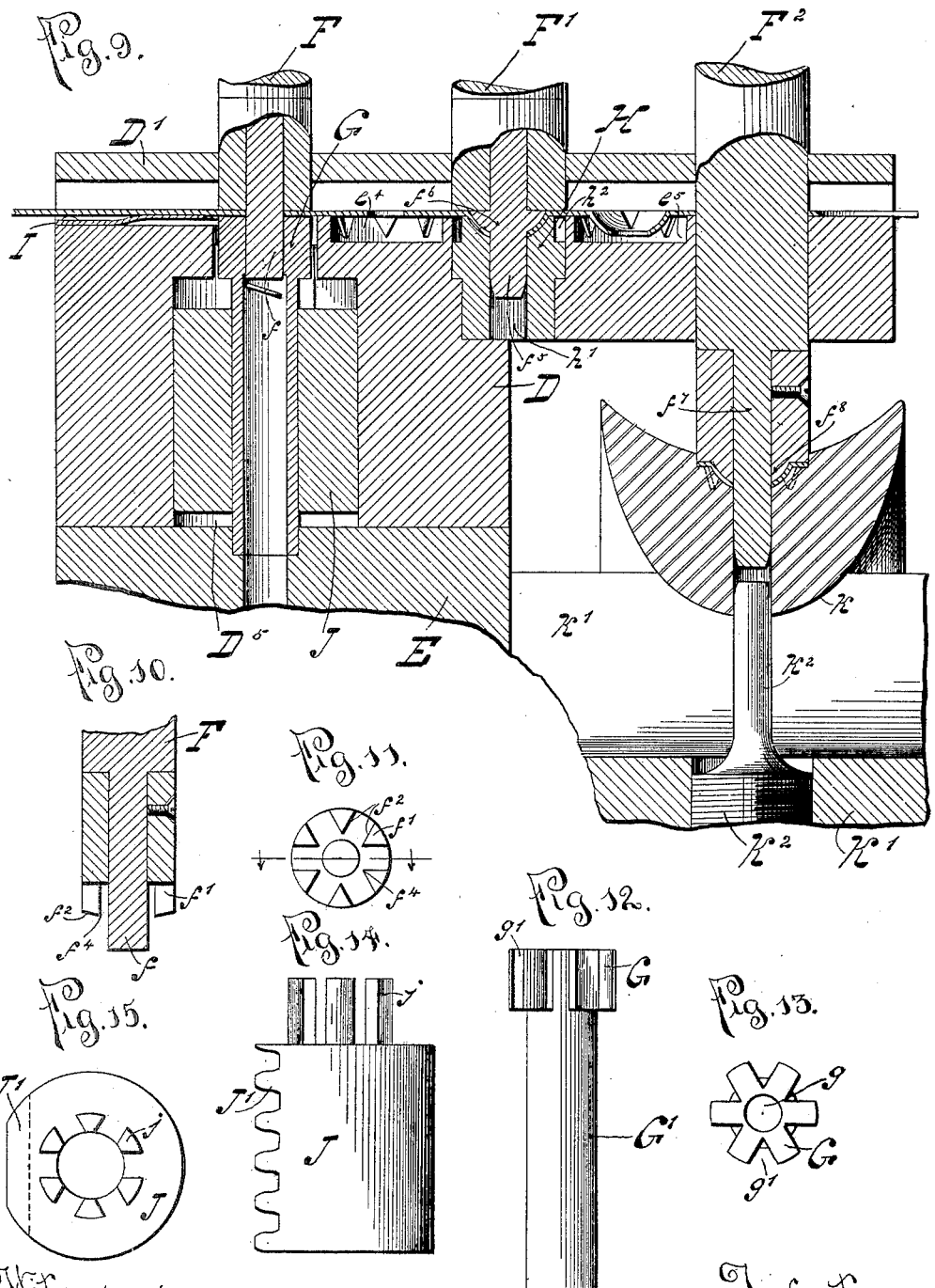

UNITED STATES PATENT OFFICE.

AXEL LEVEDAHL, OF AURORA, ILLINOIS, ASSIGNOR TO THE AURORA AUTOMATIC MACHINERY COMPANY, OF SAME PLACE.

MACHINE FOR MAKING AND APPLYING SPOKE-WASHERS.

SPECIFICATION forming part of Letters Patent No. 595,108, dated December 7, 1897.

Application filed June 7, 1897. Serial No. 639,756. (No model.)

*To all whom it may concern:*

Be it known that I, AXEL LEVEDAHL, of Aurora, in the county of Kane and State of Illinois, have invented certain new and useful Improvements in Machines for Making and Applying Spoke-Washers; and I do hereby declare that the following is a full, clear, and exact description thereof, reference being had to the accompanying drawings, and to the letters of reference marked thereon, which form a part of this specification.

This invention relates to a machine intended for forming and applying to wooden bicycle-wheel rims metal spoke-washers of that kind having projections or prongs which enter the wood of the rim to hold the washers in place and to prevent the splitting of the rim.

The invention consists in the matters hereinafter described, and pointed out in the appended claims.

In carrying out my invention it is my purpose to form the spoke-washers from a metal strip by the action of suitable dies and to apply the washers to the rims one by one as they are shaped or formed and severed from the strip. To secure these ends, it is my purpose to employ a machine having main parts or features as follows, namely: a feeding device for the metal blank or strip by which the same shall be advanced to the operative parts of the machine by which the washers are formed, punching and forming dies adapted to act upon the strip to give shape to the washers before the same are completely severed therefrom, and means for finally severing the washer from the blank strip and pressing or applying the same upon or to the wooden rim.

I have illustrated in the accompanying drawings one operative embodiment of my invention, which may be more readily understood by reference to said drawings, in which—

Figure 1 is a side view of a machine embodying the invention. Fig. 2 is a front or face view thereof. Fig. 3 is an enlarged detail section taken through the main operative parts of the machine on line 3 3 of Fig. 4. Fig. 4 is a detail plan view, on an enlarged scale, of the operative parts which rest on the bed-plate of the machine. Fig. 5 is a detail view of the same parts, shown in front elevation. Fig. 6 is an enlarged detail view of the parts which operate the feed-roller, as seen from the side of the machine. Fig. 7 is a detail cross-section taken through the opposing dies, which act first on the strip, taken on line 7 7 of Fig. 4. Fig. 8 is a detail sectional view taken longitudinally through the feed-rollers and parts which operate the same on lines 6 6 of Fig. 4. Fig. 9 is an enlarged detail section through the several punching and forming dies, showing the same when operating upon the metal strip and after the finished washer has been punched from said strip. Fig. 10 is a detail section of the upper punch, by which the teeth on the washer are formed. Fig. 11 is an end view of the same. Fig. 12 is a detail side view of the lower die, which coacts with said punch. Fig. 13 is a plan view showing the upper end of the same. Fig. 14 is a side view of the blank-lifter. Fig. 15 is a top or end view of the same. Fig. 16 is a detail plan view of the die-plate. Fig. 17 is a central section of the same. Fig. 18 is a detail plan view of the die-plate cap. Fig. 19 is an end view of the same. Fig. 20 is a face view of the strip, showing the several steps in the formation of a washer. Fig. 21 is a longitudinal section of the same. Figs. 22 and 23 are face and side views of a finished washer made by the machine.

The machine illustrated has the general form of a die-press, the same comprising a cast-metal frame A, having a die-supporting bed or table A' and an overhanging part or arm $A^2$ above the same, provided with vertical guides $A^3$ $A^3$, in which is mounted a vertically-sliding die-carrying head or plunger B, which is given vertical reciprocating motion from a crank-shaft C, mounted at the top of the frame, by means of a connecting-rod or pitman B'. The machine-frame also embraces a lower supporting part or standard $A^4$, by which the die-supporting bed or table A' is sustained at an elevation above the floor convenient for the operator who attends to the machine.

The operative parts of the machine consist principally of upper movable and lower stationary punching and forming dies, which operate on the blank strip to form the washers and feed mechanism by which the strip is advanced step by step to the dies.

Before entering upon a detailed description of these parts of the apparatus it may first be stated that the several pairs of punching and forming dies operate at the same time on the blank to perform different steps in giving shape to the washers, so that a plurality of steps in such operation are accomplished at each downward movement of the reciprocating head or plunger of the machine, the opposing pairs of punches and dies being arranged in a straight line and at equal or uniform distances apart, so that at each advance movement of the blank strip the same will be acted upon successively by the devices which perform the several steps in the process. Moreover, the feed mechanism is arranged to operate in conjunction with the movements of the head or plunger to advance the strip an equal distance at each stroke of the plunger, so as to feed the parts of the blank being operated upon successively to the several forming devices.

As a further means of making clear the construction and operation of the machine the construction of the washer to be made therein and the steps by which the washer is formed will first be stated.

Referring now to the washer itself, which is shown in Figs. 22 and 33, the same consists of a circular plate W, having a central hole $w$ for the spoke and a central recess or depression $w'$, concentric with the hole to receive the spoke-head. Around the periphery of the washer are formed a plurality of depending points, teeth, or spurs $w^2$, formed by cutting radial inwardly-projecting tongues from the metal of the washer and bending said tongues downwardly at right angles with the face of the same. In the process of making these washers the central hole is first punched in the blanks and the tongues to form the prongs are in the same operation severed along their free edges and bent downwardly at right angles to the blank, such cutting and bending of the prongs being accomplished by a properly-shaped punch acting in connection with a cutting and bending die.

Referring to Figs. 20 and 21, which show the blank strip and illustrate the several steps in the formation of the washer, S indicates the said strip, $s$ the center hole which is first punched therein, $s'$ triangular openings in the strip, and $s^2$ prongs which have been punched from the said openings and bent outwardly at right angles with the face of the strip, these features being located at the part $s'$ of the strip which is first acted upon by the machine. At $S^2$ is shown the part of the strip which has been acted upon by the forming-dies to give the central depression or cup shape to the blank, $s^3$ indicating the said depression. At $S^3$ is shown the part of the blank at which has taken place the third operation, which is that of punching out a circular piece of metal constituting the entire washer at the points previously acted upon by the preceding dies, a round hole $s^4$ being left where the washer has been punched out by a circular die.

Now, referring to the upper and lower punching and forming dies by which the operations above referred to are performed, these parts in the construction illustrated in the drawings are made as follows: D indicates a die-plate which is mounted on the table A', but which is directly sustained or supported by means of a supporting-plate E, said plate E being secured at the top of the table A' and the die-plate being arranged to overhang the front edge of the same and to afford space beneath it for the placing of the rim in position to receive the completed washers as fast as formed. Over said die is located a cap-plate D', provided on its under surface with a groove, which forms with the top surface of the die-plate a horizontal passage for the blank strip, said passage extending in a direction longitudinally of the die-plate and from the rear toward the front of the machine. In the said cap-plate D' are formed three holes $d\ d'\ d^2$ for the passage of the movable upper dies or punches F F' F$^2$, which are secured in the reciprocating head or plunger B, above the die-plate D, and are arranged in a straight row from the rear to the front of the machine and at equal distances apart. In the die-plate D, below the cap-plate D', are formed three openings or apertures D$^2$ D$^3$ D$^4$, which are arranged beneath and in axial alinement with the punches F F' F$^2$. The punch F operates, in connection with a lower tubular die G, arranged in the aperture D$^2$, to form the central hole in the blank and to punch out the prongs, and also coöperates with the margins of the hole D$^2$ to bend downwardly the said prongs. The punch F' is a forming-punch and coöperates with a forming-die H, which is inserted in the opening D$^3$ of the die-plate. The punch F$^2$ is a circular cutting-punch to sever the margin of the washer from the blank strip, and it coöperates with the aperture D$^4$ of the die-plate, which aperture is circular and cylindric in form and is adapted to fit the circular punch.

Referring more in detail to the punch F and its opposing die G, said punch is provided with a central concentric projection or pin $f$, adapted for punching out the central hole in the blank and coacting with the central opening $g$ of the lower die G. Said punch F is also provided with a plurality of annularly-arranged triangular projections or punching-prongs $f'$, separated from each other and from the central pin $f$ and having cutting edges $f^2 f^2$ at the angles formed between their end surfaces and inner lateral faces, Figs. 10 and 11. The extremities of said punching-prongs $f'$ are beveled or inclined downwardly and inwardly, Fig. 10, so that the inclined end faces of the prongs intersect the oblique faces $f^2$ thereof to form angles, which intersect to form salient points $f^4$, which first enter the blank in the act of cutting or punching. The die G, Figs. 12 and 13, is adapted to fit within the hole $D^2$ of the die-plate and extends downwardly to and is attached to the plate E, the lower part G′ of said die being made of tubular form and inserted at its lower end in a socket in the said plate, which latter is provided with a passage which forms a continuation of the hollow interior of the die to permit the escape of fragments punched from the blanks. Said die G is provided in its upper part with a plurality of external V-shaped grooves $g'$, which extend to the upper surfaces of the die and correspond in size and cross-sectional shape with the punching-prongs $f'$, which latter are adapted to fit within said grooves $g'$ in the operation of punching the metal. Inasmuch as the said die G fits within the hole $D^2$ in the die-plate, the grooves $g'$ will form a series of triangular openings or apertures when the plate is viewed from above, said apertures being adapted to receive the punching-prongs $f'$. It is to be understood, however, that the inner edges of the prongs $f'$ and the edges of the grooves $g'$ operate only as cutting edges to sever the metal of the blank, and that the external diameter of the punch F is so much less than that of the hole $D^2$ and the cutting-die G as to provide spaces equal to the thickness of the metal being punched between the outer faces of the punching-prongs and the inner surface of the said hole $D^2$. It follows that after the angular cuts have been made to sever the free ends of the prongs from the blank strip said prongs will be bent inwardly into the grooves $g'$ and over the edge of the hole $D^2$ of the die-plate by the action of said punching-prongs $f'$. This operation of the parts is clearly illustrated in Fig. 9, which shows the opposing dies and blank during the operation of punching.

In view of the fact that the prongs of the blank are bent downwardly into the recesses of the lower die as the first step in the operation, it is necessary in order to permit the forward feeding of the blank strip after the said teeth are formed to lift the blank strip to an extent sufficient to permit the teeth to clear the surface of the die in their forward movement. The guide-passage for the blank will be sufficiently deep to permit the passage of the strip therethrough after the prongs have been bent downwardly thereon, and an upwardly-pressing spring I is located in the said passage with its free end adjacent to the die G, said spring tending to hold or press the blank strip against the cap-plate D′, so that it will be depressed into contact with the lower die G only during the cutting or punching operation. Such spring will ordinarily serve the purpose of lifting the strip, so as to release the teeth from the holes in the die-plate as the upper punch F rises, but in order to make certain that the blank strip shall in every instance be lifted before the feeding device moves to advance the strip I have provided a positively-actuated lifting device, which is constructed as follows: J is a tubular block located in a guide-passage $D^5$, which is formed in the die-plate below and concentric with the opening $D^2$, said block being arranged to slide upon the lower part G′ of the die G. Said part G′ is extended through the recess $D^5$ and secured in the supporting-plate at the bottom of said recess, as above stated. The block J is provided at its upper end with a plurality of vertical, parallel, triangular, annularly-arranged lifting prongs or teeth $j$, that fit and slide within the grooves $g'$ of the die G, and the said block J is adapted for vertical movement, so that the teeth $j$ may be thrust or carried upwardly above the top of the die G to lift the blank strip after the punching operation has been completed, it being of course understood that the teeth $j$ will be withdrawn so far below the top of the die G when the punch F descends as to prevent interference with the punching and bending operation hereinbefore described. The devices for actuating the blank-lifting teeth and their supporting-block will be hereinafter described.

Now referring to the forming-punch F′ and die H, said forming-punch is provided with a central guide-opening $f^5$ and a rounded projection or boss $f^6$, which coöperates with a correspondingly-shaped recess $h$ in the die H, said die H having a central passage $h'$ for the guide-pin $f^5$. Around the top margin of the said die H is formed a groove or rabbet $h^2$, which forms with the side of the opening $D^3$ in the die-block a groove to receive the prongs or teeth of the blank strip at the time the said blank strip is depressed into contact with the lower die H in the operation of the punch F′ thereon. It will be understood from the above that after the punching-dies F and G have operated upon the blank strip the latter is fed forward far enough to carry the punched holes in the blank centrally over the die H, so that in the next descent of the head B with the several punches the forming-punch F′ will act to give cup shape to the central part of the washer at the same time that the punch F and die G act upon a new part of the blank strip.

Now referring to the punch $F^2$, said punch, as before stated, is a circular punch which operates in connection with the opening $D^4$ in the die-plate to detach the margin of the washer from the blank strip, such detachment finishing or completing the washer and leaving it in readiness for attachment to the rim. Said punch $F^2$ is shown as provided with a central guide-pin $f^7$, and inasmuch as the punch operates not only to cut the washer from the blank, but also to force it into its seat in the wooden rim the punch is provided also with a concentric rounded projection $f^8$, which fits within the central recess of the washer and thereby avoids possibility of distortion of the washer under the pressure of the punch, which might occur if the punch acted upon the raised margin of the washer only.

For supporting the rim beneath the outer part of the die-plate and in position to receive the finished washer, which is carried downwardly through the die-plate and against its seat in the rim, a support or anvil is provided, said anvil having preferably the form of a bracket K, projecting forwardly from the table A' beneath the overhanging plate D and the die-plate supported thereby. The upper part of said anvil, against which the wheel-rim rests, preferably consists of a wooden block K', having a grooved top surface somewhat more convex than the curvature of the rim and provided with a central guide-groove $k$, in which the lower convex surface of the rim rests. At the center of the block K' is preferably formed a transverse groove $k'$, and through the block and the bracket K is inserted a vertical screw-shaft $K^2$, having at its upper end a guide-pin $k^2$, which projects above the top of the block and is adapted to enter the previously-bored spoke-holes in the rim, so as to accurately center the said holes opposite or beneath the cutting-die and punch. Said screw-shaft $K^2$ is provided with a head on its lower end and with a jam-nut acting against the bracket K, this construction enabling the guide-pin $k^2$ to be adjusted vertically in accordance with the necessities of the work being done.

The spoke-holes in the rim are usually not bored radially with respect to the wheel center, but are inclined or oblique, as required for so-called "tangent" spokes and also for the lateral inclination of the spokes required to give stiffness to the wheel. Said diversity in the direction of the spoke-holes makes it necessary to tip or incline the rim during the act of applying the washers thereto, so that the washers may be inserted accurately at right angles to the central axes of the spoke-holes. In the case of the holes for tangent spokes the wheel-rim must obviously be swung in a direction to carry its center at one side or the other of the center line of the anvil, while the lateral inclination of the spoke-holes makes it necessary to swing the lower part of the rim toward or from the front face of the machine. The anvil-block K' is adapted for these movements of the rim by reason of the shape of the groove therein, and in order to enable the wheel-rim to be accurately placed in the several required positions in the act of boring I provide stops or gages for this purpose, which are constructed as follows: L is a horizontal rod which extends across the front of the frame-standard $A^4$ beneath the table A' and is attached to the front ends of two horizontally-sliding bars L', which pass through suitable guide-sockets $l$ in the frame and are adjustably held therein by set-screws $l'$, Fig. 1. Said rod is shown as passing through holes in the outer ends of the bars L' and as held therein by set-screws $l^2$. On the outer ends of the rod L are located sliding blocks $L^2 L^2$, provided with set-screws $l^3$, by which the blocks may be adjustably secured to the said rod L. In the said blocks $L^2$ are inserted L-shaped guide-arms $L^3$, which are adjustably secured to the blocks by set-screws $l^4$ and which extend horizontally outward exterior to the wheel-rim and then inwardly toward the center thereof past said wheel-rim. The outer ends of the rod L, together with the forwardly and laterally extending parts of the arms $L^3$, constitute stops to limit the movement of the lower part of the wheel-rim both backwardly and forwardly and laterally in both directions, it being obvious that if the wheel-rim be swung rearwardly it will strike the rod L. If it be swung outwardly, it will strike the outer parts of the arms $L^3$, and if swung laterally in either direction it will be arrested by contact with the vertically-extending parts of said arms $L^3$. The extent of movement of the wheel-rim may be controlled as desired by adjustment of the said rod L and arms $L^3$, it being obvious that the shifting of the supporting-bars L' forwardly and backwardly in the frame and a similar shifting of the arms $L^3$ will vary the forward and rear positions of the wheel-rim, while the shifting of the blocks $L^2 L^2$ inwardly or outwardly upon the rod L will serve to change the extent of the lateral movement of the said rim.

The operation of applying the finished washer to the rim will be obvious, the operator being required only to move or shift the rim to bring one spoke-hole after another beneath the punch F and to swing the said rim backwardly and forwardly or laterally as the rim is turned, according to the arrangement of the spoke-holes.

Now referring to the feed devices by which the blank strip is fed to the punching and forming dies, said feed device is made as follows: M M' are lower and upper feed-rolls which are mounted on shafts $M^2 M^3$, which are arranged horizontally and transversely of the machine and are provided with intermeshing gears $M^4 M^5$, by which the upper is driven from the lower shaft. The lower shaft $M^2$ is mounted in bearing-apertures in bearing-blocks E', which are located at opposite sides of the gear-wheel $M^4$ and bolted to the plate E, preferably by tap-bolts extending through said plate from beneath the same. The upper shaft $M^3$ is mounted in bearing-apertures which are formed in the outer ends of overhanging arms or goosenecks $E^2$, which are cast integral with the blocks E' and are connected with the rear edges of the latter blocks. The upper shaft and its bearings may be adjusted toward and from the lower shaft by the springing or yielding of said goosenecks in order that the strip may be gripped more or less tightly by the feed-rollers, according to the requirements of the work being done. The overhanging arms or goosenecks $E^2$ are conveniently formed by casting them in the form of closed rings or loops with the blocks $E'$ and then severing the loops between the bearings by a suitable cutting-tool. In order to hold the said feed-rollers together with a yielding or variable pressure, studs $E^4$ $E^4$ are inserted in the lower bearing-blocks $E'$ and extend upwardly through the upper bearing-arms $E^2$, and said studs are provided on their upper ends with screw-threads and with nuts $e$ $e$, between which nuts and the tops of the arms $E^2$ are located spiral springs $e'$ $e'$.

Provision is made for giving rotary motion to the lower feed-roller shaft $M^2$ by devices, as follows: N is a ratchet-wheel which is rigidly attached to said shaft $M^2$ outside of the outer bearing-block $E'$. Mounted on the shaft $M^2$ concentric with the said ratchet-wheel is an oscillating pawl-plate $N'$, which carries two pawls $n$ $n$, which are held in contact with the ratchet-wheel by suitably-applied springs, said springs being herein shown as formed by a single spring-plate $n'$, secured at its center to a stud $n^2$, projecting from the pawl-plate $N'$ over the ratchet-wheel. Mounted upon the said shaft outside of the pawl-plate $N'$ is an oscillating feed-arm O. In the said feed-arm O is formed a curved or segmental slot $O'$, arranged concentric with the pivotal axis of the arm, and in said pawl-plate $N'$ are secured two studs $N^2$ $N^2$, which project from the outer ends of the pawl-plate into said slots $O'$, said studs being arranged at equal distances from the central axis of the shaft and being located at a distance apart less than the length of the slot $O'$ in the feed-arm. Said studs constitute, in effect, stops by which the pawl-plate is actuated or given oscillatory motion from the feed-arm, and said studs are so arranged with respect to the ends of the slot $O'$ as to give lost motion between the parts when the feed-arm is oscillated, but at the same time will move or give oscillatory movement to said pawl-plate when the ends of the slot $O'$ come in contact with the said studs. Said ends of the slot (indicated by $o'$ $o'$) constitute, in effect, stops which coöperate with the stops formed by the studs $N^2$ to transmit oscillatory motion from the feed-arm to the pawl-plate. Said studs $N^2$ are adjustably secured in the pawl-plate by being inserted through and secured in a concentric slot $N^3$, which slot in the pawl-plate is arranged opposite the slot $O'$ in the oscillating arm.

In the operation of the parts described the feed-arm O is given oscillatory movement by suitable driving connections attached to its free end, and its oscillatory movement is transmitted to the pawl-plate $N'$. The pawls which are mounted on said plate are carried backwardly and forwardly along the ratchet-wheel, so as to turn the same through a partial revolution at each stroke of the feed-arm.

The adjustable connection described between the feed-arm and the pawl-plate affords lost motion between the said parts and enables the time of advancement of the strip to be accurately regulated in accordance with the movement of the reciprocating punches, it being obvious that by the shifting of the studs $N^2$ in their holding-slots in the pawl-plate the feed-arm may be made to act upon and move said pawl-plate at an earlier or later period in the stroke of the feed-arm. In other words, the adjustable studs described enable the time of feed to be controlled independently of the extent of feed, which latter may also be controlled by said studs, although devices are also provided by which the throw of the feed-arm may be varied.

The devices shown for actuating the said feed-arm O consist of a crank-disk $C'$ on the crank-shaft of the machine and a connecting-rod $O^2$, which engages a crank-pin $c$ in the crank-disk and is pivoted to the end of the said feed-arm. To afford means for adjusting the throw of the feed-arm, the said crank-disk $C'$ is provided with a transversely-arranged groove $c'$ of T shape, said groove extending inwardly from one edge or face of the disk and being adapted to receive a T-hand on the crank-pin $c$, a clamping-nut $C^2$ being applied to the crank-pin to hold the same in position within the said slot. By adjusting the crank-pin inwardly and outwardly in the slot $c'$ the throw of said crank-pin and consequently the throw of the feed-arm may be changed or regulated as desired.

As a means of rigidly securing the die-plate D in place upon the supporting-plate E said die-plate is provided at its opposite sides with horizontal ribs or projections $d^3$ $d^3$, and removable holding-plates Q Q' are located upon the plate E at opposite sides of the die-plate, said plates being provided on their adjacent faces with grooves $q$, adapted to receive the ribs $d^3$ of the die-plate. The holding-plate Q at one side of the guide-plate is shown as arranged to abut at its outer edge against an integral abutment $E^5$ on the plate E, said plate Q being conveniently held in place by tap-bolts $q'$ $q'$. At the outer edge of the plate Q' is located an abutment $E^6$, which is cast upon the plate E and through which pass two clamping-screws $Q^2$ $Q^2$, that act upon the adjacent edge of the plate Q' to force the same toward the die-plate D and thus clamp the same firmly in place. Said plate Q' is held upon the plate E by means of tap-bolts $q^2$, which pass through slots in the plate Q', adapted to permit slight lateral movement to said plate under the action of the clamping-bolts. The holding-plates, as well as the outer end of the die-plate, overhang the rim and its supporting-anvil.

Referring now to the actuating device for moving the blank-strip lifter J, these parts are made as follows, Fig. 4: R is a rock-shaft which is mounted in a bearing-aperture in the plate Q and is arranged horizontally with its rear end extending past the rear face of said plate. Attached to said rock-shaft is an oscillating arm I', which is provided at its free end with a toothed segment $r$, which intermeshes with a rack J' on the side of the block J. Said arm I' is conveniently secured to the rock-shaft by being inserted through a transverse hole in the same and clamped therein by means of a set-screw $r'$ passing axially through the rock-shaft and projecting from the rear end thereof. Attached to the said rock-shaft and rising therefrom is an actuating-lever R². Said lever extends upwardly at the rear of the sliding head or plunger B and is provided with a cam-slot $r^2$, which is engaged by a stud $r^3$ projecting rearwardly from the said plunger B, said slot being vertical in its upper part and deflected laterally at its lower part, so that the strip-lifter will be drawn downwardly as the plunger descends and will be lifted and held in its elevated position during the time the plunger is rising and again starting in its descent.

The feed devices will preferably be arranged to advance the strip a distance equal to one-half of the space between the centers of the forming-dies and plungers at each stroke, this construction being employed in order that practically the entire length of the strip may be utilized in the making of the washers, it being obvious that if the strip were advanced a distance equal to the distance between the plungers at each stroke the washers would be formed at intervals equal to that distance and unused parts of the strip would be left between them. In connection with the feed devices thus arranged the die-plate is provided with recesses $e^4 e^5$, located in alinement with the lower dies, the purpose of said recesses being to receive the projections or prongs on the blank strip when the latter is depressed at each stroke of the machine.

At the front of the die-plate and above the path of the blank is located a guide-roller T, around which the blank strip is carried after it passes from the dies, said blank strip being wound upon a suitable reel or otherwise disposed of, so that it may be kept out of the way of the operator, who stands in front of the machine to manipulate the wheel-rim to which the washers are being applied.

The machine illustrated is provided with the usual auxiliary attachments, such as a driving and fly wheel U and a clutch device (indicated as a whole by V) which is operated by suitable connections from a foot-lever V'.

I claim—

1. A machine for making and applying spoke-washers, comprising means for cutting and shaping the washers from a blank strip, means for feeding the blank strip to the cutting devices, a support for the wheel-rim and means for pressing the finished washers against the wheel-rim.

2. A machine for making and applying spoke-washers comprising washer cutting and shaping dies, means for feeding a blank strip to the dies, a support for the wheel-rim, and means for pressing the finished washers upon the wheel-rim.

3. A machine for making and applying spoke-washers comprising means for cutting and swaging the washers from a blank strip, and a support for a rim located in operative relation thereto, said cutting and shaping devices embracing a reciprocating punch acting to finally sever the washer from the blank strip and to press it against the rim.

4. A machine for making and applying centrally-apertured spoke-washers comprising cutting and shaping means embracing a reciprocating punch and an apertured, stationary die for severing the finished washer from the blank, said punch being adapted to pass through the die, in order to carry to and force against a rim held opposite said die, the washers cut from the blank by the punch, and being provided with a centering pin or projection which engages the aperture of the washer.

5. A machine for making and applying spoke-washers, comprising combined punching and bending dies consisting of a punch provided with a plurality of punching and bending prongs and a die having punching and bending recesses, constructed to cut a plurality of teeth from the blank and bend the same outwardly, and cutting-dies for severing the finished washers consisting of a stationary apertured die-plate and a punch which passes through said die-plate to force the several washers into contact with a rim held opposite the said die.

6. A machine for making and applying spoke-washers comprising combined punching and bending dies, consisting of a punch provided with a plurality of prongs and a die having a plurality of recesses which coact with the prongs to cut a plurality of teeth from the blank and to bend the same outwardly, swaging-dies which give concave form to the blank and cutting-dies for severing the finished washers, consisting of a stationary, apertured, die-plate and a punch which passes through said die-plate to force the severed washers into contact with the wheel-rim.

7. A machine for making and applying spoke-washers comprising stationary cutting and bending dies, movable cutting and bending punches and a reciprocating head or plunger carrying said punches, the die upon which the washer is finished being apertured and the punch which cuts the finished die from the blank being constructed to pass through its coacting die to press the washer against the wheel-rim, and a centering pin or projection on said last-mentioned punch which engages the aperture of the washer.

8. A machine for making and applying spoke-washers, comprising stationary cutting bending and swaging dies, movable cutting, bending and swaging punches, a reciprocating head or plunger carrying said punches, means for feeding a blank strip between the stationary dies and plungers one of said coacting dies and punches acting to sever the finished washer from the blank and a support for sustaining the rim opposite the punch and die which severs the finished washer from the blank.

9. A machine for making and applying toothed spoke-washers comprising a die and punch which coact to both cut and bend the teeth of the washers, a swaging die and punch for giving concave shape to the washer and a cutting die and punch for severing the finished washer, said dies and punches being arranged in a straight line, a head or plunger carrying the said punches, means for feeding the blank strip between said dies and punches and a support for sustaining the rim opposite the punch and die which severs the finished washer from the blank.

10. A machine for making spoke-washers comprising coacting cutting and bending dies which act to sever from the blank the edges of a plurality of teeth or prongs and also to bend the same outwardly from the plane of the blank, and cutting-dies which sever the blank to detach the finished washers.

11. A machine for making spoke-washers comprising coacting cutting and bending dies which act to sever from the blank the edges of a plurality of teeth or prongs, and also to bend the same outwardly from the plane of the blank, and cutting-dies which sever the blank outside of the teeth, to form the finished washer.

12. Dies for forming teeth on spoke-washers, one of which is provided with cutting and bending prongs and the other with recesses to receive said prongs, said prongs and recesses having coacting, angular cutting edges which act to sever the edges of the washer from the blank along the margins of the teeth and having inner and outer concentric coacting bending edges and parallel adjacent faces perpendicular to the faces of the dies which are laterally separated to form spaces to receive the thickness of the metal of the prongs.

13. Dies for forming teeth in spoke-washers, comprising a punch having annularly-arranged punching and bending prongs, a die-plate and a die fitting in a hole in the die-plate, the said die being externally grooved to form cutting edges which coact with those on the punching-prongs and the edges of the hole in the die-plate together with the outer edges of the punching-prongs forming bending-surfaces.

14. Dies for forming teeth on spoke-washers, comprising a punch having annularly-arranged punching and bending prongs a die-plate and a die fitting in a hole in the die-plate, the adjacent surfaces of the die and die-plate being shaped to form recesses to receive the prongs, which recesses are provided with cutting and bending edges which coöperate with those on the prongs.

15. Dies for forming teeth on spoke-washers comprising a punch having annularly-arranged prongs each having at its end two inner oblique cutting edges, and an outwardly-facing bending edge, and a die provided with recesses to receive said prongs, said recesses having each two inner, oblique cutting edges and an outer bending edge corresponding with those on the prongs of the punch.

16. The combination with a punch having cutting and bending prongs and a die having cutting and bending recesses of a blank-lifter having fingers which extend through the recesses in the die.

17. The combination with a vertically-movable punch having cutting and bending prongs and a stationary die having cutting and bending recesses, of a vertically-movable blank-lifter having fingers which extend upwardly through the recesses of the die, and means for giving vertical reciprocating motion to said blank-lifter.

18. The combination with a vertically-movable punch having cutting and bending prongs, and a stationary die having cutting and bending recesses, of a vertically-movable blank-lifter having fingers which extend upwardly through the recesses in the die, a plunger to which the said punch is attached, and means for actuating the blank-lifter from the plunger, consisting of a rock-shaft having an arm which engages the blank-lifter, and an arm provided with a cam-slot, which is engaged by a stud on the plunger.

19. The combination with cutting and bending dies and punches, and a reciprocating plunger carrying the punches, of feed-rollers for a blank strip and means for actuating the feed-rollers comprising a reciprocating feed-arm, a ratchet-wheel which drives the feed-rollers, an oscillating pawl-plate carrying pawls which act on the ratchet-wheel, and stops on the said feed-arm and pawl-plate which are adjustable relatively to each other to vary the feed of the blank strip.

20. The combination with washer forming and applying mechanism, of an anvil for the wheel-rim, said anvil being provided with a centering-stud to engage the spoke-holes in the wheel-rim.

21. The combination with washer forming and applying mechanism, of an anvil for supporting the wheel-rim, and adjustable stops located at the front and rear of the rim to limit the rearward and forward inclination of the same.

22. The combination with washer forming and applying mechanism, of an anvil for supporting the wheel-rim and adjustable stops at the front and rear and also at the sides of the rim, to determine the front and rear as well as lateral inclination of the wheel-rim.

In testimony that I claim the foregoing as my invention I affix my signature, in presence of two witnesses, this 21st day of April, A. D. 1897.

AXEL LEVEDAHL.

Witnesses:
C. CLARENCE POOLE,
WILLIAM L. HALL.